United States Patent [19]

Shepherd

[11] 4,342,913
[45] Aug. 3, 1982

[54] PORTABLE RADIATION DOSIMETER

[75] Inventor: Robert A. Shepherd, Brampton, Canada

[73] Assignee: Selco Inc., Toronto, Canada

[21] Appl. No.: 166,063

[22] Filed: Jul. 7, 1980

[51] Int. Cl.³ .............................................. G01T 1/20
[52] U.S. Cl. .................................. 250/364; 250/380; 250/435
[58] Field of Search ............... 250/435, 438, 364, 370, 250/380

[56] References Cited

U.S. PATENT DOCUMENTS

| | | | |
|---|---|---|---|
| 3,189,742 | 6/1965 | Leuba | 250/364 |
| 3,968,371 | 7/1976 | Greendale | 250/380 |
| 4,104,523 | 8/1978 | Wolfert | 250/364 |
| 4,185,199 | 1/1980 | Droullard et al. | 250/435 |

Primary Examiner—Bruce C. Anderson

[57] ABSTRACT

A portable radiation dosimeter unit for continuously measuring exposure to radioactive decay products in ambient air. The unit is constructed as a unitary assembly suitable for mounting on a portable battery casing, the assembly housing a constant flow air pump for maintaining a constant flow of air through a filter, a detection unit and electronic circuitry connected to the detection unit for processing, counting and storing pulses generated by the detection of radioactive particles from decay products entrapped by the filter. The filter is readily replaceable, and in use is clamped in position by a clamp assembly pivotally mounted on a front wall of the unit, the clamp assembly providing an internal air passage forming part of the air flow path and positioned to receive the air which is drawn through the filter.

8 Claims, 12 Drawing Figures

PORTABLE RADIATION DOSIMETER

FIELD OF THE INVENTION

This invention relates to a portable radiation dosimeter of the type adapted to be worn by miners, for example, and to be used for measuring the wearer's accumulative exposure to radioactive particles, namely alpha particle radiation from airborne radioactive decay products such as radon and thoron.

BACKGROUND OF THE INVENTION

A radiation dosimeter of this type comprises essentially a pump for inducing a flow of ambient air through a filter, a radiation detector positioned so as to receive alpha emissions from decay products entrapped by the filter, and electronic circuitry for processing and counting pulses generated in response to the detection of alpha emissions. The pulse count is stored and subsequently read into a central readout unit at the end of a working day. The product unit, which is typically a general purpose computer capable of addressing the dosimeter circuitry by an appropriate code, maintains a record of the miner's "working level hours" corresponding to the accumulative exposure to radiation as measured by the dosimeter.

One such radiation dosimeter is described in U.S. Pat. No. 4,055,762 to John Durkin, issued Oct. 25, 1977 and entitled "Radon Daughter Dosimeter".

Although the principle of this method of measuring accumulative exposure to alpha radiation is well known, there have until now been serious difficulties in its practical application to field use. One difficulty has been to assemble the essential components of the equipment in a convenient package which can be worn by a miner without encumbering him in his work. Another difficulty has been to construct a unit which would have the required sensitivity and be sufficiently robust to withstand rough handling during use.

SUMMARY OF THE INVENTION

These difficulties are overcome by the present invention, which provides such a dosimeter in the form of a compact unitary assembly having a common casing for the equipment components. The dosimeter comprises: a housing providing an inlet for ambient air; means defining a chamber within the housing adjacent a front wall thereof to receive ambient air via said inlet, the chamber having a frontal opening; a clamp assembly releasably mounted on the front wall of the housing, the clamp assembly providing a peripheral seal to said frontal opening and an internal air passage positioned to interconnect said frontal opening with a second air inlet to the housing; a filter located in cooperative relation to said frontal opening to intercept air flowing from said chamber to said internal air passage, the filter being clamped in position by said clamp assembly; an air pump mounted in the housing, the pump being connected to said second air inlet for inducing a flow of air from said chamber and through said air passage via the filter; a detection unit incorporating a radiation detector and mounted within the housing, the detection unit having a window positioned in juxtaposition to the filter, and electronic means connected to said radiation detector for processing and counting pulses generated by the detection of radioactive particles from decay products entrapped by the filter.

The key feature of the construction is the clamp assembly, which on the one hand serves to clamp the filter in place, enabling the filter to be replaced easily, and on the other hand provides an air passage forming part of the air flow path, enabling the detection head to be mounted within the housing immediately behind the filter.

BRIEF DESCRIPTION OF THE DRAWINGS

One preferred embodiment of the invention will now be described, by way of example, with reference to the accompanying drawings in which.

GENERAL DESCRIPTION OF THE PREFERRED EMBODIMENT

Figure 1:
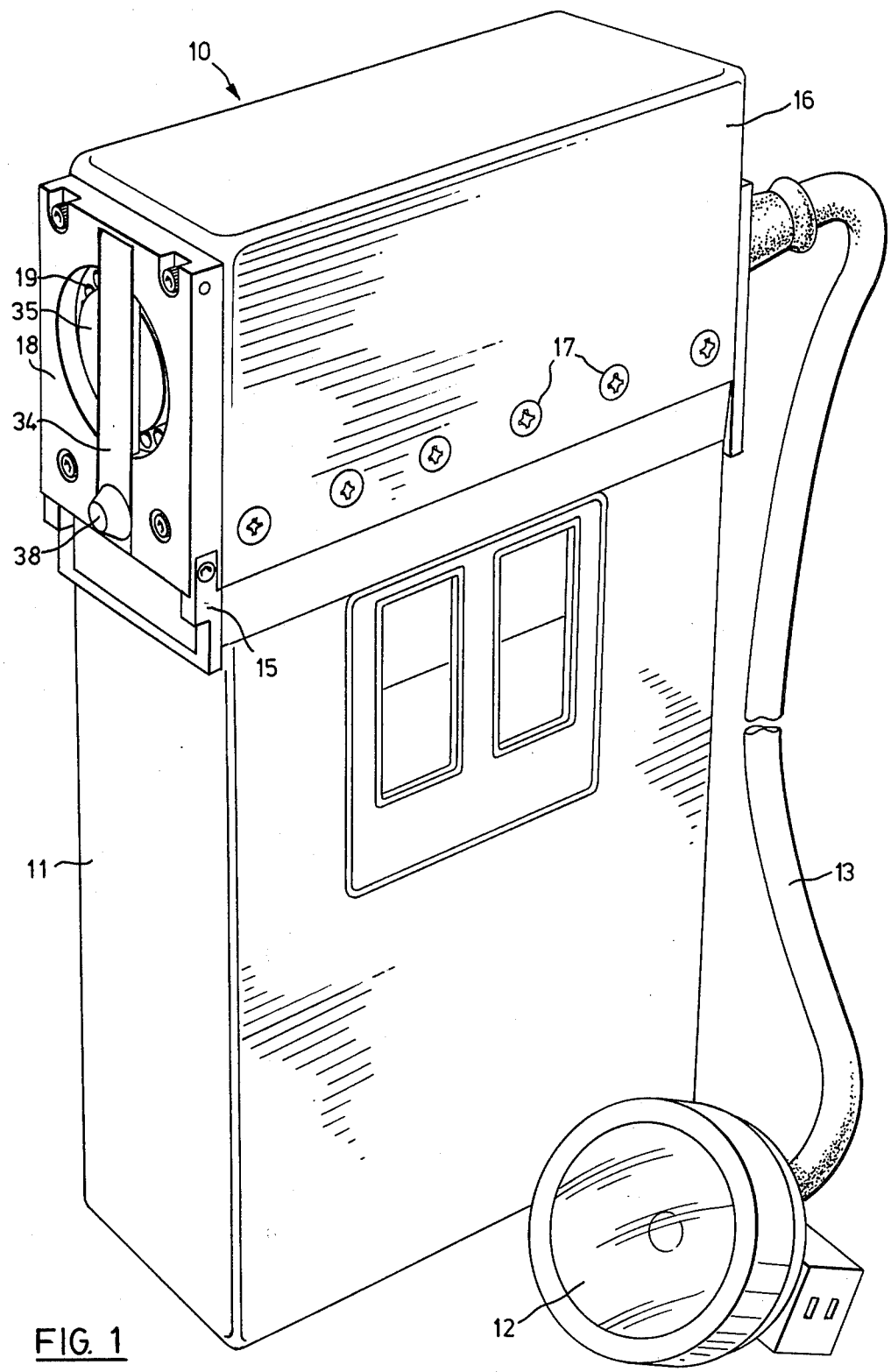
FIG. 1 is a view of a dosimeter in accordance with the invention, the figure showing also a miner's lamp connected to the unit for operation from a common power supply.
Figure 2:
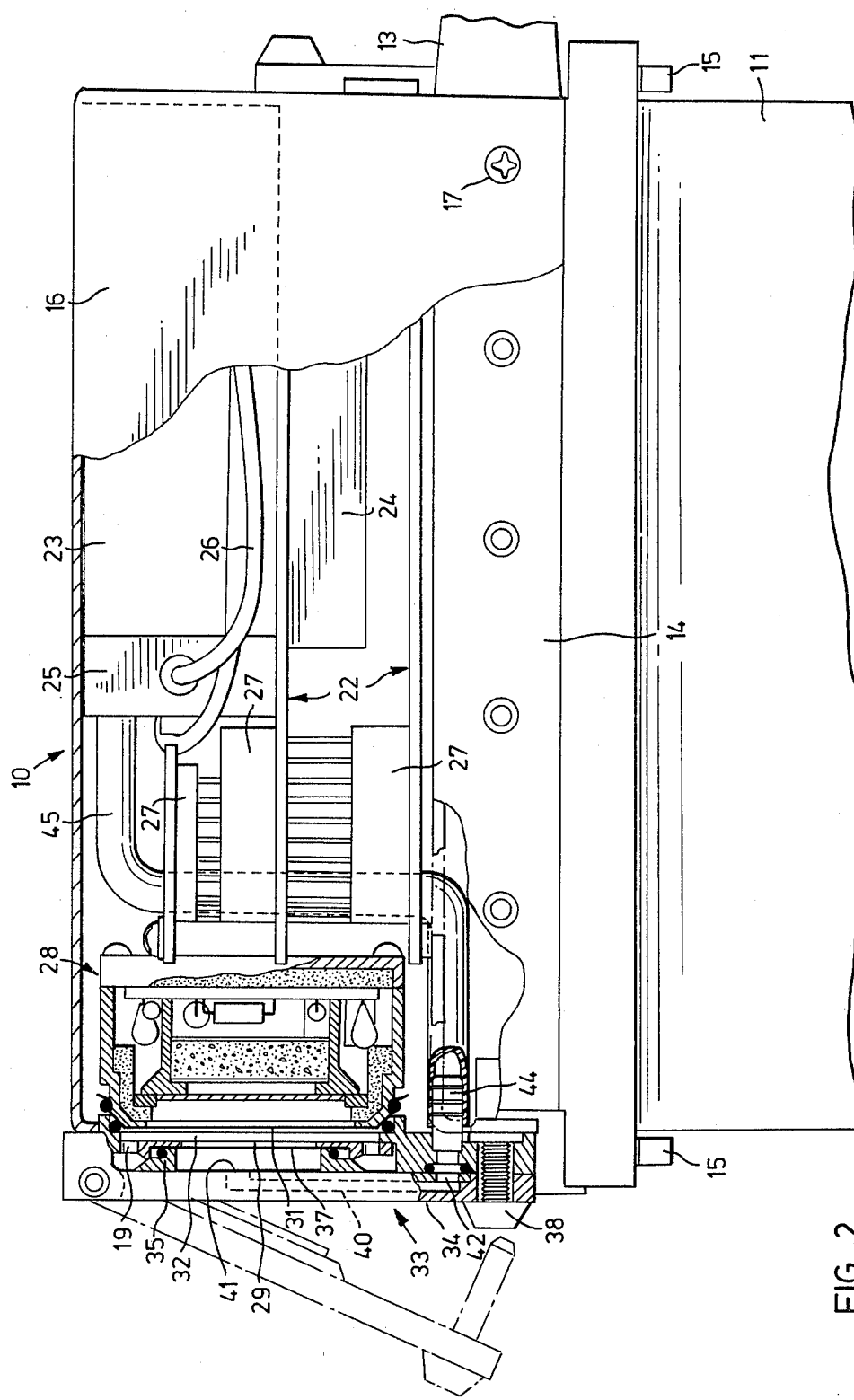
FIG. 2 is a partly sectioned side elevation of the unit.
Figure 3:
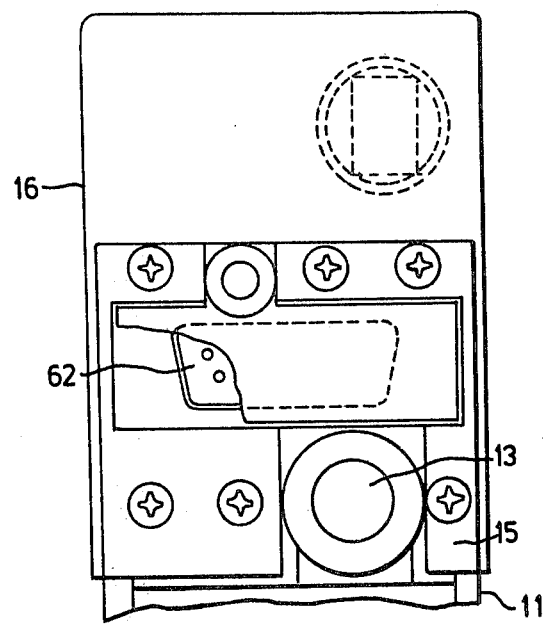
FIG. 3 shows a detail of the rear wall of the unit.

The equipment illustrated in the drawings is a compact, rugged and lightweight unit consisting of a detector, electronics and a pump. Its method of counting utilizes a 25 mm filter viewed by a solid state, diffused junction, detection system. An internal constant flow pump continuously draws air through the filter at 100 cc/min. The airborne daughters of radioactive decay products such as radon and thoron are entrapped by the filter and their disintegration is counted by the detector, amplified and stored within the memory. This memory has the capability of storing 1,000,000 alpha counts, this being the equivalent of approximately 37.5 working level hours. Its lower level of detection is limited only by the absence of decay products and their daughters. The unit also internally monitors functions (battery and pump) which ensures the data is accurate and dependable.

The dosimeter is designed to perform complex functions yet remain extremely easy to operate. The unit worn by the mining personnel has no external controls, and so it cannot be accidentally misused. The filter is readily changed before the shift and the data is dumped after the shift.

The dosimeter is adapted to be used in conjunction with an "above ground" reading network. A microprocessor controlled version of the reader directs all modes of operation for the dosimeter. The quantity of units which can be accommodated in this way is virtually unlimited. One important aspect of control is the varying time in which the data can be dumped. The standard time in which the transfer of data occurs would be after radon daughters have decayed on the filter (approximately 3½ hours). The next reading (if necessary) allows one to test for the presence of thoron daughters. This ability adds great versatility to an already effective system.

DETAILED DESCRIPTION OF THE PREFERRED EMBODIMENT

Referring to FIGS. 1 to 4 of the drawings, the dosimeter unit 10 is mounted on the casing of a battery 11, the battery being of a conventional type commonly worn by miners and uses as a portable self contained power supply for a lamp 12 as well as for the dosimeter unit 10. The unit is operatively connected to the battery by a connector mounted in its base, electrical connections from the battery being extended through a cable 13 to the lamp 12. The dosimeter unit 10 has a support chassis 14 which is securely mounted on the top of the battery casing by brackets 15. A cover 16 mounted on the chassis and secured thereto by screws 17 forms a housing of the unit. The front wall 18 of the unit is formed with a ring of holes 19 providing an inlet for ambient air.

Mounted on the support chassis 14 within the housing 16 are printed circuit boards 22, on which are mounted a constant flow air pump 23, a pump controller 24, and a pressure switch 25 for switching the pump via air lines 26. Also mounted on the printed circuit boards are the various circuit board interconnectors 27. A detection unit 28, which will subsequently be described in detail, is shock mounted at the rear side of the front wall 18.

The detection unit 28 is thus mounted immediately behind the front wall 18 of the unit, which front wall has a circular opening 29, a gasket 30 making a peripheral seal around the opening 29. The window 31 of the detection unit thus defines with the front wall 18 a chamber 32, into which ambient air can flow via the inlet holes 19, and from which the air can flow via the circular opening 29. A clamp assembly 33 is pivotally mounted on the external face of the front wall 18. This clamp assembly comprises a swing arm 34 carrying a circular plate 35. The front wall is also formed with an annular step 36 which encircles the opening 29 and defines a recess for locating a filter 37. The filter is mounted across the frontal opening 29 in cooperative relation thereto, being located by means of the annular step 36, and being clamped in position by the cover plate 35 when the assembly 33 is secured in the clamping position. For the purpose of clamping the assembly, the swing arm 34 carries a captive screw 38 which is engageable in a threaded blind socket 39 at the front end of the support chassis.

The swing arm 34 is formed with an internal channel 40 constituting an air flow passage. This passage has an inlet 41 positioned to cooperate with the opening 29 so as to receive filtered air from the chamber 32, and an outlet 42 positioned to cooperate with a second air inlet 43 on the front wall 18 of the housing 16. A hose barb 44 at the second air inlet 43 provides a connection for an air hose 45 to the pump 23. Thus, in operation of the unit, the pump 23 induces a flow of ambient air via the inlet 19 into the chamber 32, whence it passes via the filter 37 to the air passage 40 of the clamp assembly, and then via the air hose 45 to the pump 23, being finally exhausted from the housing 16. As the air passes through the filter, radioactive decay products are entrapped by the filter, and radioactive particles therefrom are detected by the detection head 28.

Figure 4:
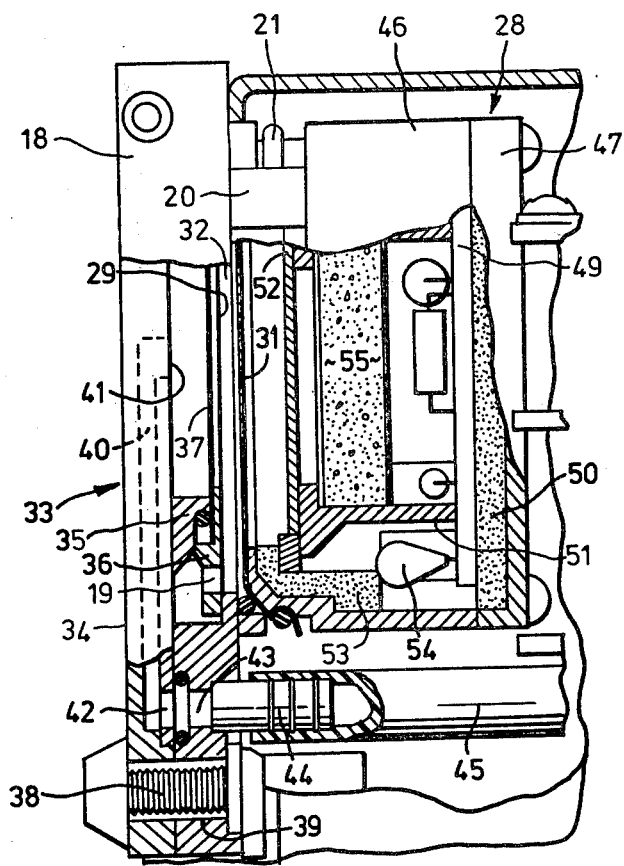
FIG. 4 is an enlarged part-sectional view showing a detail of FIG. 2.

The mounting of the detection unit 28 and its associated components is shown in detail in FIG. 4. The unit provides a detector housing formed by a cylindrical casing 46 to which is bolted a housing lid 47 constituting a rear wall of the detector housing, the front wall being formed by a radiation-transparent sheet of aluminized "Mylar" (trademark) constituting the window 31. The radiation-transparent sheet 31 is clamped to the casing 46 by an O-ring 21 which engages in a groove on the outside of the casing. The unit 28 is mounted on the rear face of the front wall member 18 of the dosimeter housing by machine screws within stand off bushes 20 which are designed to absorb shock.

The diffused junction detector 52 is mounted within the detector housing on a cylindrical support 51, which extends from a rigid printed circuit board 49, the latter being mounted on the plate 47 and being separated from it by an intervening cushion of shock absorbing material 50. This material is a shock absorbent visco-elastic polymeric material, preferably the material sold under the trademark "Scotch Damp" by Minnesota Mining and Manufacturing Company. An annular cushion 53 of the same material is interposed between the forward end of the detector mount 51 and the flanged forward end of the casing 46.

Also mounted within the detector housing are the preamplifier electronic components, e.g. the component 54, and the interior is kept dry by a suitably positioned quantity of silica gel 55.

Figure 5:
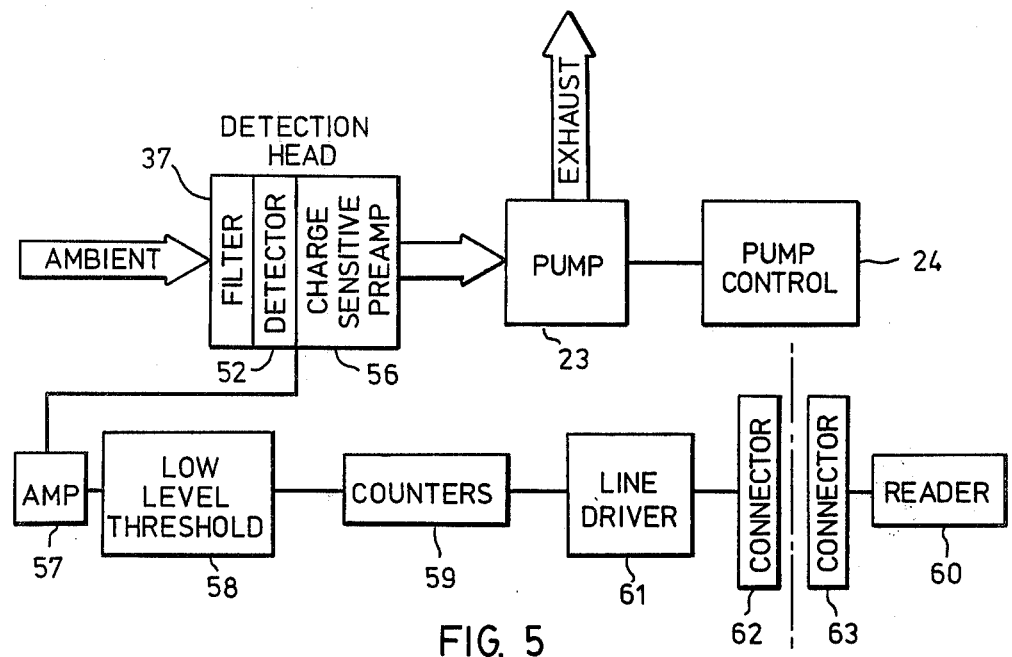
FIG. 5 is a schematic flow diagram illustrating the principle of operation of the equipment.

The general manner of operation of the dosimeter unit in use is apparent from FIG. 5. Ambient air is drawn through the filter 37 by the pump 23, the pump being controlled by unit 24. Alpha particle emissions from decay products remaining on the filter 37 are detected by the radiation detector 52, which is coupled to a preamplifier 56. The resultant pulses, after amplification by an amplifier 57 are discriminated according to level by a low level threshold detector 58, the output pulses being applied to counters 59. The accumulated count at the end of a shift is read out into a suitable reader 60, through line drivers 61, the dosimeter having a connector 62 for coupling to the connector 63 of the reader. The reader, which forms no part of the present invention, is an electronic assembly capable of accepting the data fed to it by the dosimeter and converting the data to a legible form. The reader determines when the dosimeter is to be read, or when each of a series of dosimeters is to be read, interprets all serial data supplied to it, and prints out the acquired data for visual inspection. Readers of this type are known in the art, one such reader being described, for example, in the above-identified U.S. Pat. No. 4,055,762 of John Durkin.

Figure 6:
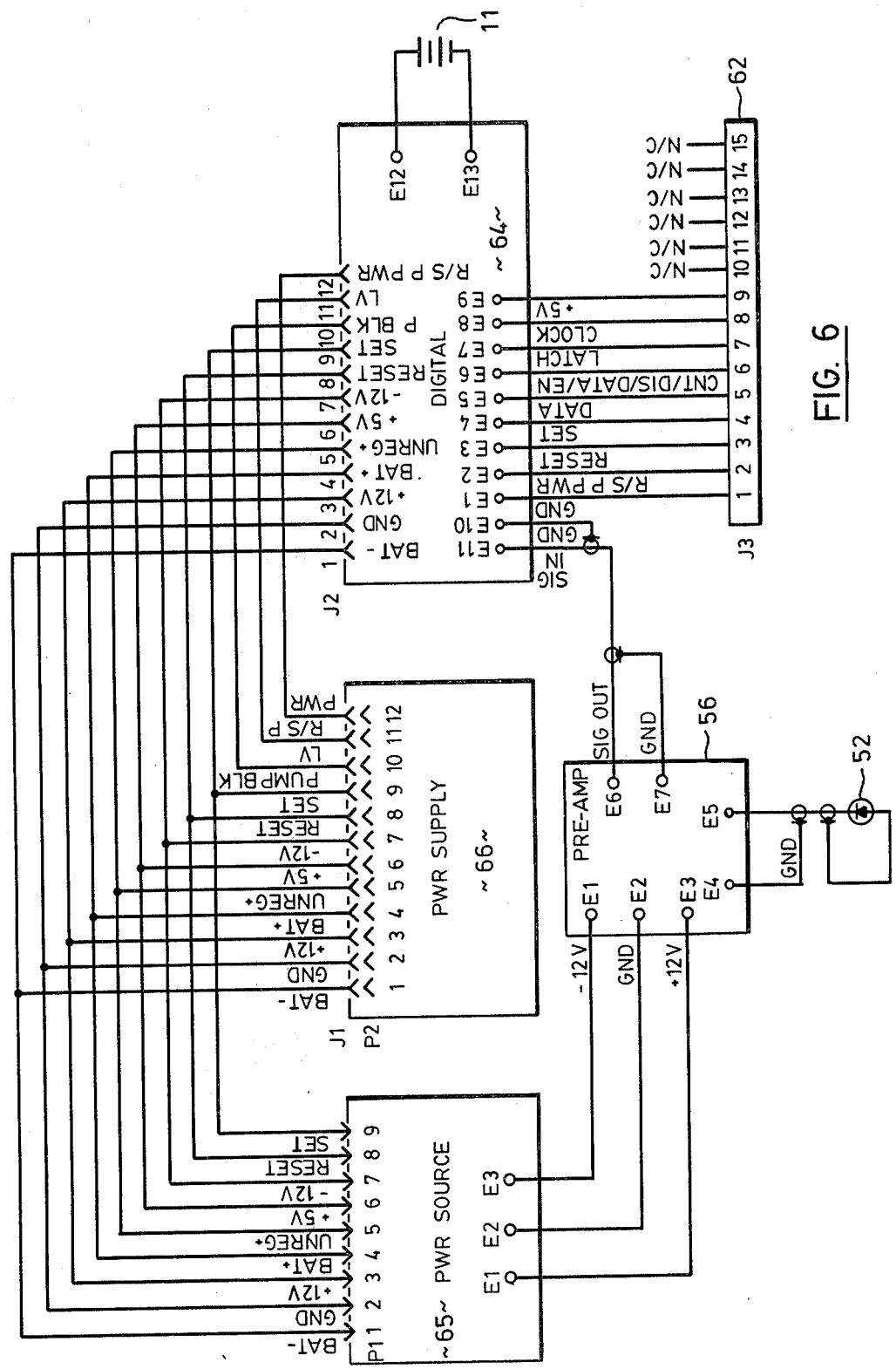
FIG. 6 is an interconnection diagram showing the organization of the electronic circuitry.

The electronics of the dosimeter unit will now be described. FIG. 6 illustrates the interconnections of the various circuits shown in the subsequent figures, namely the power source 65 (FIG. 7), the power supply 66 (FIG. 8), the logic circuitry 64 (FIGS. 9a, 9b and 9c) labelled "DIGITAL", and the preamplifier 56 (FIG. 10).

Figure 7:
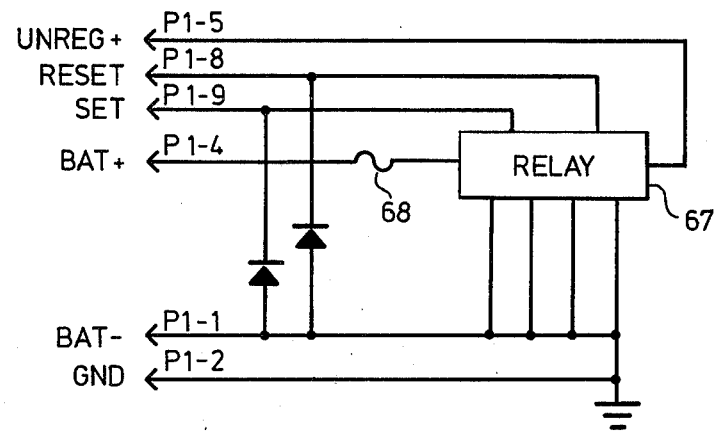
FIG. 7 is a schematic wiring diagram of the power source in FIG. 6.
Figure 7:
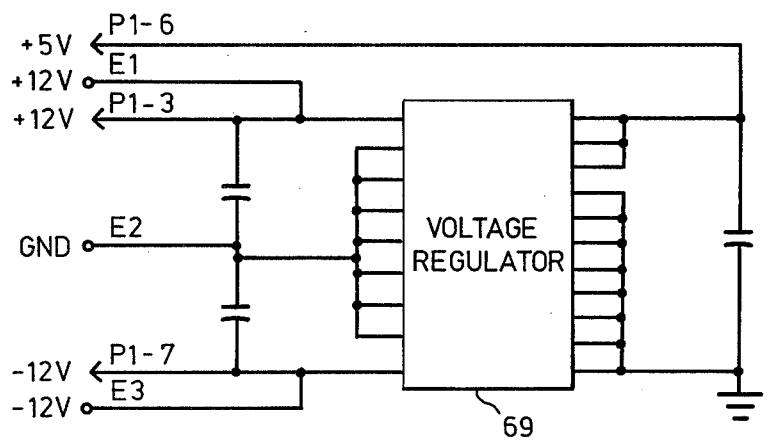

Referring to FIG. 7, the power source includes a relay 67 which is energized from the battery 11 (FIG. 6) via a line fuse 68. This circuit also includes a voltage regulator 69 providing a regulated voltage supply for the preamplifier 56.

Figure 8:
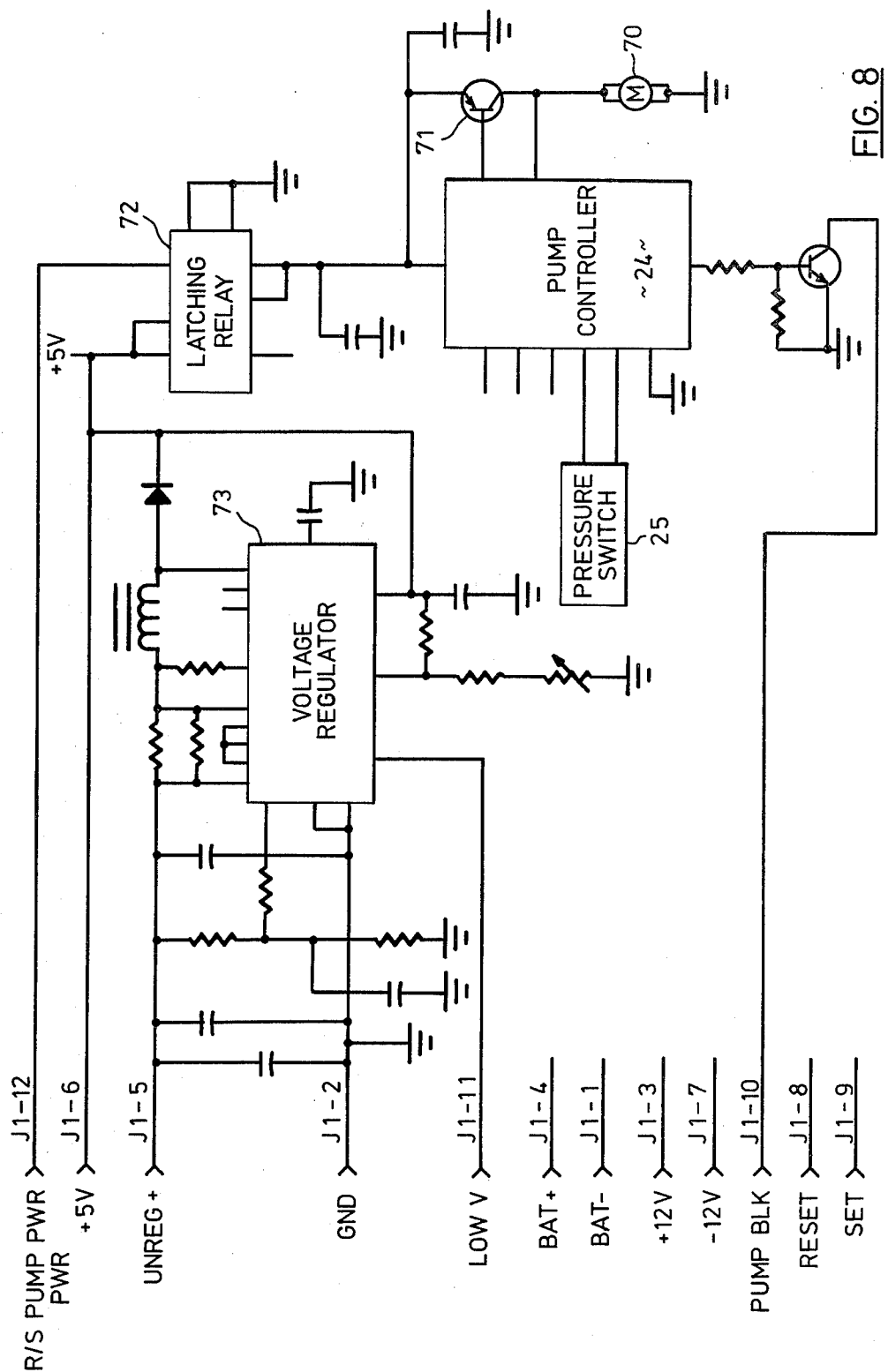
FIG. 8 is a schematic wiring diagram of the power supply shown in FIG. 6.

Referring to FIG. 8, the pump motor 70 is supplied with current from a driver 71 which is controlled by the pump controller 24. The pump controller is controlled by the pressure switch 25. The pump supply circuit is maintained by a latching relay 72, and the pump supply voltage is maintained at a regulated +5 V by a voltage regulator 73.

Figure 9A:
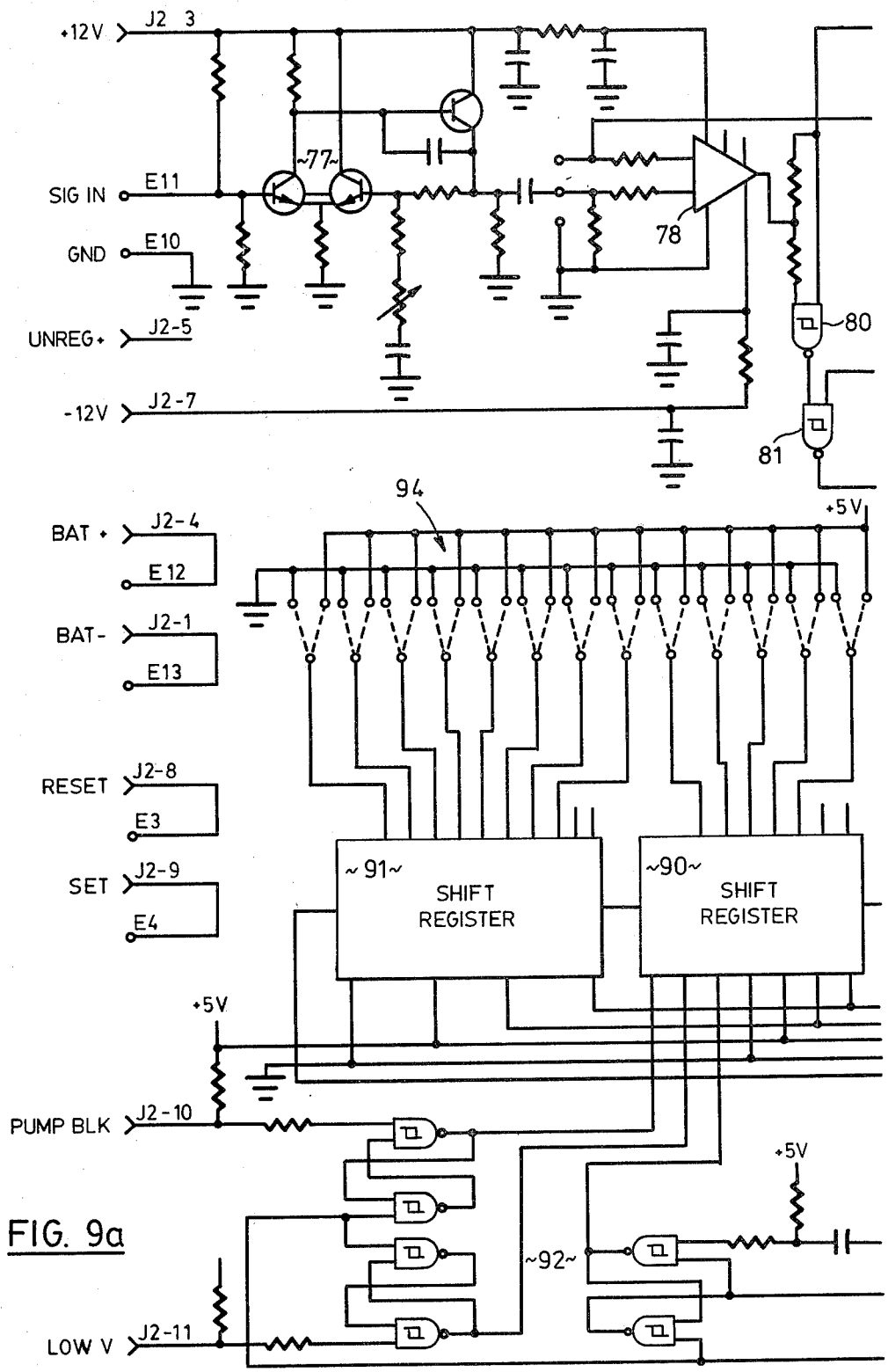
FIGS. 9a, 9b and 9c together are a schematic wiring diagram of the circuit labelled "DIGITAL" in FIG. 6.
Figure 9B:
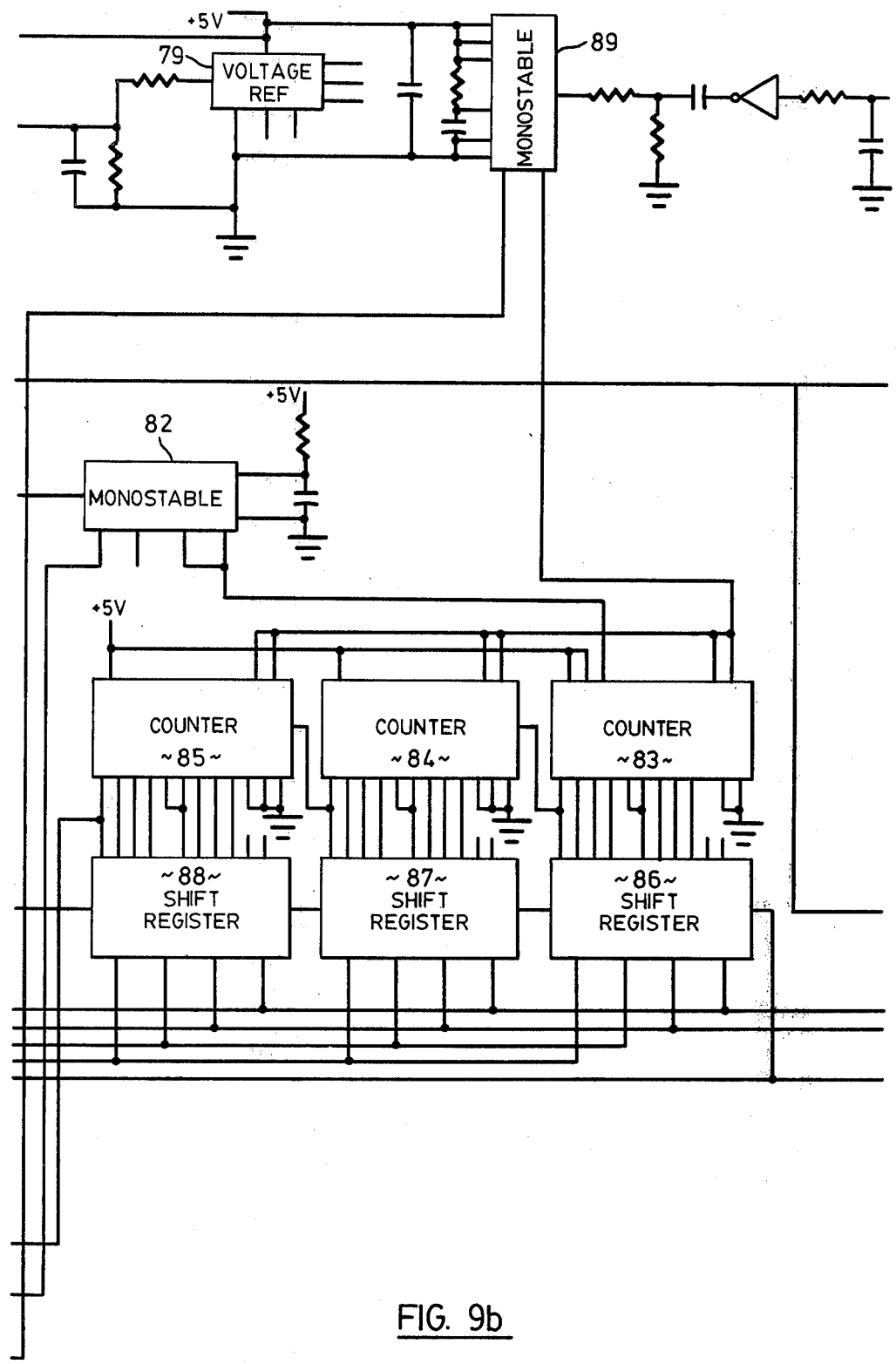
Figure 9C:
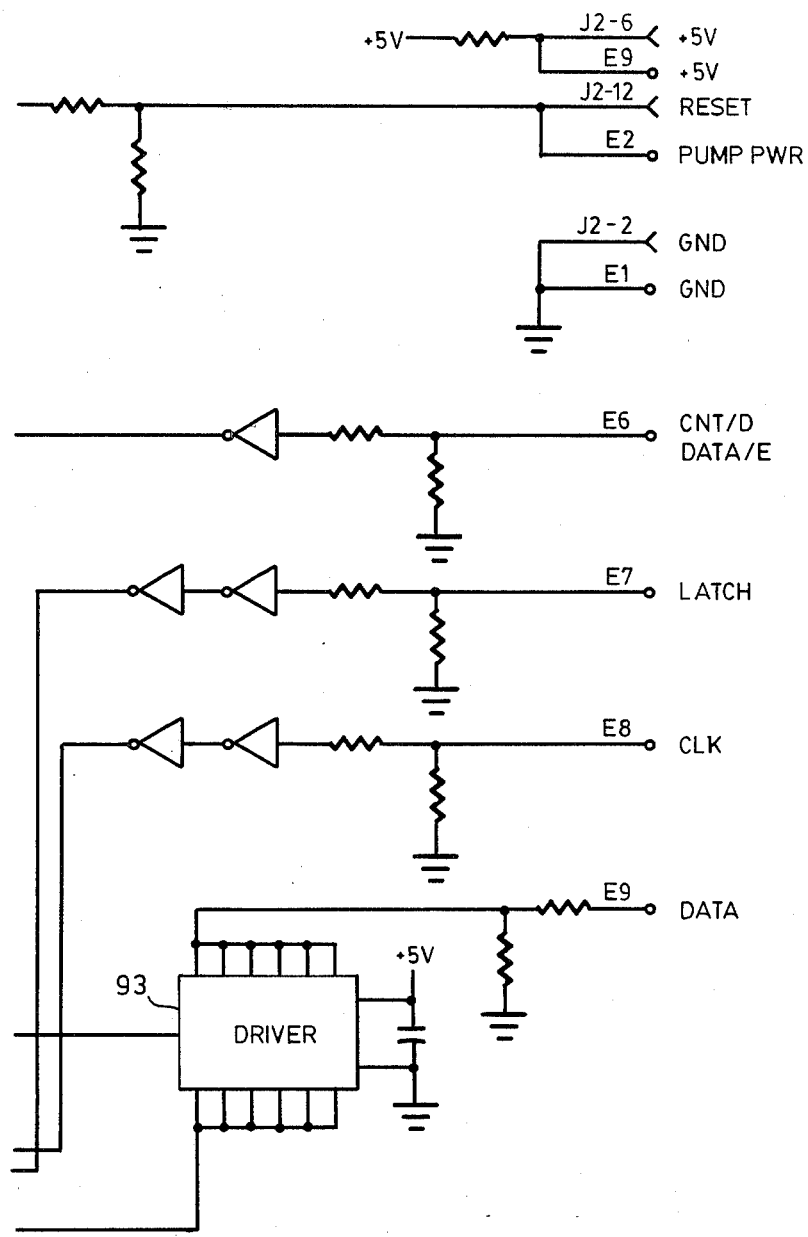
Figure 10:
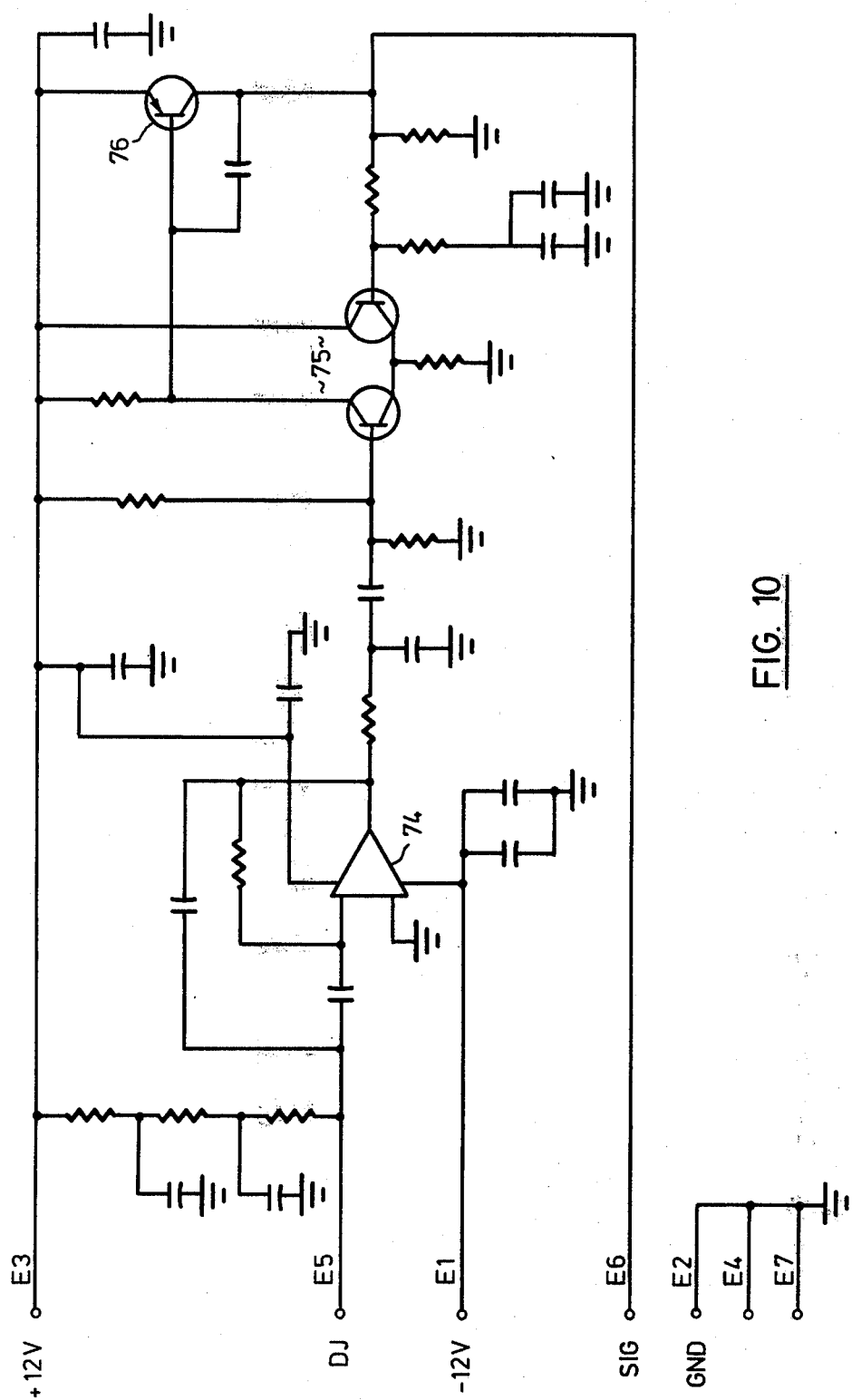
FIG. 10 is a schematic wiring diagram of the preamplifier shown in FIG. 6.

FIG. 10 shows the circuit of the preamplifier, the supply terminals of which are shown at E1, E2 and E3. The input signal from the diffused junction detector is applied through terminal E5 to an operational amplifier 74, whose output is applied to a driver 75 connected to an output stage 76. The output signal is transmitted to the data processing circuitry of FIG. 9 via output terminal E6.

Referring to FIGS. 9a, 9b and 9c, the input signal from the preamplifier is applied to input terminal E11 and to a driver 77, the signal then being applied to one input of a voltage comparator 78 and compared with a reference voltage supplied by circuit 79 which determines the selected threshold level. Discriminated pulses from the comparator 78 pass via gates 80, 81 to a monostable 82 and applied to digital counters 83, 84, 85, the pulse count being stored in shift registers 86, 87 and 88. A second input of gate 81 is connected to terminal E6, and in response to an appropriate signal from the read-out unit the count is inhibited. The shift registers are then latched via terminal E7 and in conjunction with the clock pulse from the terminal E8 the contents of all shift registers 86, 87 and 88 shifted through driver 93, the data appearing at terminal E9. The shift registers 90, 91 store the identifying code of the particular equipment, the code being determined by the configuration of the bank of connections 94.

In the use of the equipment, the pump 23 is operated by the battery 11 and alpha particles from decay products entrapped by the filter 37 are counted, the count being accumulated in the shift registers 86, 87 and 88. At the end of a shift the dosimeter is connected to the central read-out unit, along with the other dosimeters which were used in a shift. The dosimeters are scanned sequentially by a sequence of address signals each corresponding to the particular address code of a respective dosimeter, and deposit their stored data into the read-out unit in the appropriate time slots.

What I claim is:

1. A portable radiation dosimeter for measuring accumulative exposure to radioactive particles comprising, as a unitary assembly;
   a housing providing an inlet for ambient air,
   means defining a chamber within the housing adjacent a front wall thereof to receive ambient air via said inlet, the chamber having a frontal opening,
   a clamp assembly releasably mounted on the front wall of the housing, the clamp assembly providing a peripheral seal to said frontal opening and an internal air passage positioned to interconnect said frontal opening with a second air inlet to the housing,
   a filter located in cooperative relation to said frontal opening to intercept air flowing from said chamber to said internal air passage, the filter being clamped in position by said clamp assembly,
   an air pump mounted in the housing, the pump being connected to said second air inlet for inducing a flow of air from said chamber and through said air passage via the filter,
   a detection unit incorporating a radiation detector mounted within the housing, the detection unit having a window positioned in juxtaposition to the filter, and electronic means connected to said radiation detector for processing and counting pulses generated by the detection of radioactive particles from decay products entrapped by the filter.

2. A portable radiation dosimeter as claimed in claim 1, wherein the clamp assembly is pivotally mounted on an external face of the front wall of the housing, means being provided for releasably securing the clamp assembly in clamped position.

3. A portable radiation dosimeter as claimed in claim 2, wherein the front wall of the housing provides an annular step encircling the frontal opening, the step defining a recess in which the filter is located, the clamp assembly including a pressure pad positioned to engage the filter when in the clamped position.

4. A portable radiation dosimeter as claimed in claim 1, including means for controlling the air pump to maintain a constant rate of air flow therethrough.

5. A portable radiation dosimeter as claimed in claim 1, wherein the radiation detector is a solid state diffused junction detector.

6. A portable radiation dosimeter as claimed in claim 5, wherein the detection unit includes a detector housing shock mounted within the dosimeter housing, the detector housing having one wall formed by a radiation-transparent sheet constituting said window, the diffused junction detector being mounted on a support located within the detector housing, the support being mounted on a shock absorbing cushion.

7. A portable radiation dosimeter as claimed in claim 5, said electronic means comprising a charge-sensitive preamplifier connected to the detector, a low level threshold detector connected to the preamplifier for discriminating pulses therefrom of low levels, counter means connected to receive and count pulses from the threshold detector, register means for storing the pulse count, and output means for transmitting the stored pulse count to a reader in response to an appropriate address signal.

8. A portable unit for use in the field for continuously monitoring accumulative exposure to radioactive particles, comprising:
   a portable self contained power supply having a casing, and
   a dosimeter unit having a support chassis securely mounted on the casing, the dosimeter unit further comprising:
   a housing providing an inlet for ambient air,
   means defining a chamber within the housing adjacent a front wall thereof to receive ambient air via said inlet, the chamber having a frontal opening,
   a clamp assembly pivotally mounted on an external face of said front wall, the clamp assembly providing a cover with a peripheral seal to said frontal opening and an internal passage positioned to interconnect said front opening with a second air inlet to the housing,
   a filter located in cooperative relation to said frontal opening to intercept an air flowing from said chamber to said internal air passage, said cover being engageable with the filter to clamp the filter in position,
   means for releasably securing the clamp assembly in the clamped position,
   a constant flow air pump mounted within the housing, the pump being connected to said second air inlet for inducing a flow of air from said chamber and through said air passage via the filter.

a detection unit mounted within the housing, the detection unit housing a diffused junction radiation detector on a shock resistant mounting, the detector having a window positioned in juxtaposition to the filter, electronic means connected to said radiation detector for processing, counting and storing pulses generated by the detection of radioactive particles from decay products entrapped by the filter, and electrical connector means operatively connecting the power supply to the air pump and to said electronic means.

* * * * *